Patented July 25, 1944

2,354,580

UNITED STATES PATENT OFFICE 2,354,580

METHOD OF MANUFACTURING CERTAIN ACYLATED POLYAMINO ETHERS

Melvin De Groote, University City, and Bernhard Keiser, Webster Groves, Mo., assignors to Petrolite Corporation, Ltd., Wilmington, Del., a corporation of Delaware No Drawing. Application April 3, 1942, Serial No. 437,610

8 Claims. (Cl. 260—404.5)

The present invention is concerned primarily with a new procedure or method for producing certain aminoethers which either have not been previously available, or could not be prepared except by laborious methods, which involved either excessive cost, or else, a preponderance of cogeneric by-products.

Said new method of manufacturing the herein described aminoethers, is of utility, in view of the reaction products obtained. Such reaction products find employment in demulsification of crude oil emulsions, in de-salting practice in oil refineries, as break inducers in the doctor treatment of sour hydrocarbons, in acidification of calcareous oil-bearing strata, and for various other uses where cation-active reagents are employed.

The reactants employed in the present method consist of (a) Hydroxylated high molal amides having at least one hydroxy hydrocarbon radical, or the equivalent, in which the carbon atom chain is interrupted at least once by oxygen and at least one amide-linked acyl radical derived from a monocarboxy detergent-forming acid; and (b) High molal amines having at least one hydroxy hydrocarbon radical, or the equivalent, in which the carbon chain is interrupted at least once by oxygen.

The type of materials employed as reactants are well known.

As to the high molal amines, one is concerned with the type which represent, in essence, the oxyalkylation derivatives of high molal primary or secondary amines. It is well known that such amines can be treated with ethylene oxide, propylene oxide, butylene oxide, glycid or the like, to give hydroxylated derivatives. Such amines, if primary amines, can be treated with one, two, ten, or twenty moles of ethylene oxide or any suitable alkylating agent. The same is true in event a secondary amine is employed. As to a complete description of such amines, reference is made to U. S. Patent No. 2,246,842, dated June 24, 1941, to Melvin De Groote. However, there is this difference in said De Groote patent—the amines therein contemplated are restricted by the fact that the ether linkages must not occur three times or more. In the present instance, there is no restriction as to the recurrence of ether linkages, and furthermore, in said De Groote patent there is no proviso that a hydroxyalkyl group or its equivalent must necessarily be present, whereas, such group is a functional group in the present instance and must appear as part of the amine.

In other words, one employs a high molal alkylol amine having present at least one hydrocarbon radical containing a carbon atom chain of an acyl radical of a detergent-forming monocarboxy acid having more than 8 carbon atoms and not more than 32 carbon atoms.

As to the hydroxylated high molal amides, one is concerned with the type of material which may be obtained as the oxyalkylation derivative of the corresponding amide or substituted amide. For instance, our high molal acid or its equivalent may be reacted with ammonia or the like to produce an amide by conventional procedure. However, amides, instead of being obtained from ammonia, may be obtained from primary amines, such as amines in which a hydrogen atom linked to a nitrogen atom has been replaced by an alkyl radical, an aralkyl radical, an alicyclic radical, an alkylol radical, or the type of radical in which the carbon chain has been interrupted at least once by an oxygen atom. Examples of such amines are amylamine, cyclohexylamine, benzylamine, monoethanolamine, tris(hydroxymethyl)-aminomethane, etc. Polyamino types may also be employed, such as ethylenediamine, bis(hydroxyethyl)ethylenediamine, etc. If one starts with ammonia, or an amine free from a hydroxylated radical, it is obvious that the amides so obtained, for instance, oleoamide, ricinoleoamide, amyloleoamide, amylricinoleoamide, or the like, can be treated with one or more moles of an oxyethylating agent, such as ethylene oxide, propylene oxide, butylene oxide, glycid, or the like, to give a high molal substituted amide having at least one monocarboxy detergent-forming acid acyl radical and at least one hydroxylated hydrocarbon group, or the equivalent, wherein the carbon atom chain is interrupted at least once by oxygen. The amide need not be basic, and thus aniline, phenylethanolamine, or the like, may also be employed as a primary reactant. Obviously, however, amides can be obtained as conveniently from a fatty acid, for example, and monoethanolamine, as would be possible by first reacting the fatty acid or its equivalent, such as the ester, with ammonia, and then subjecting the unsubstituted amide to oxyethylation. The production of such amides, and, as a matter of fact, polyamides derived from suitable polyamines, is well known and requires no further elaboration. The presence of a basic nitrogen atom, i. e., a nitrogen atom not directly linked to either an aryl group, or an acyl radical, is not objectionable, and may be desirable. For instance, one might react hydroxyethyl ethylenediamine with ricinoleic acid, so as to introduce the acyl radical, as distinguished from the acyloxy radical. It is to be noted that some of the high molal substituted amides are polyfunctional, in that two or more hydroxy hydrocarbon radicals or their equivalents are introduced. Furthermore, there is no objection to using the oxyethylating agent in substantial multiple proportions, i. e., there is no objection to introducing an ether linkage which recurs a number of times.

The monocarboxy detergent-forming acids are characterized by having at least 8 carbon atoms and not more than 32 carbon atoms, and are exemplified by fatty acids, naphthenic acids, abietic acids, acids obtained by the oxidation of petroleum or wax, and the like, or simple modifications thereof which do not detract from the ability of the acid to combine with alkali to produce soap or soap-like materials. For instance, hydrogenated oleic acid, chlorinated naphthenic acid, or brominated abietic acid, will form such detergent-like bodies with the same ease as the parent material itself. The oxidized acids obtained by blowing or oxidation of the acids or esters are satisfactory. Such acids have frequently been referred to collectively in the art as "monocarboxy detergent acids." Needless to say, the acylation need not be conducted by means of the acid itself, but may be conducted by means of any compound of the acid which contains the acyl radical; for instance, an ester, an amide, an anhydride, an acyl chloride, etc.

Preferably, the reactants employed are derived from fatty acids, particularly unsaturated fatty acids, rather than some other source of a high molal acyl radical. Our preference is to use such materials as castor oil, ricinoleic acid, oleic acid, sunflowerseed oil, soyabean oil, teaseed oil, linseed oil and the like. This is true, regardless of whether the high molal acyl group is introduced as the source of the hydrocarbon radical into the aminoalcohol or into the amide reactant in unchanged form.

Although the reactants employed are well known, a few examples will be given.

Hydroxylated High Molal Amines

Example 1

One mole of octadecenylamine is treated with two moles of ethylene oxide to give a corresponding tertiary amine, indicated by the formula:

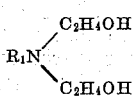

in which $R_1$ is the high molal aliphatic radical.

Hydroxylated High Molal Amines

Example 2

Cetylamine is substituted for octadecenylamine in Example 1, preceding, indicated by the formula:

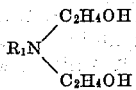

in which $R_1$ is the high molal aliphatic radical.

Hydroxylated High Molal Amines

Example 3

Stearylamine is substituted for octadecenylamine in Example 1, preceding, indicated by the formula:

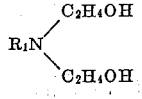

in which $R_1$ is the high molal aliphatic radical.

Hydroxylated High Molal Amines

Example 4

Oleoamine is substituted for octadecenylamine in Example 1, preceding, indicated by the formula:

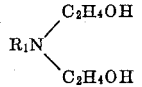

in which $R_1$ is a high molal aliphatic radical derived from commercial oleic acid.

Hydroxylated High Molal Amines

Example 5

Amines derived from naphthenic acids are substituted for octadecenylamine, in Example 1, preceding, indicated by the formula:

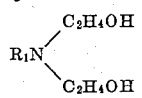

in which $R_1$ is a high molal radical derived from naphthenic acid.

Hydroxylated High Molal Amines

Example 6

Octadecylamine is substituted for octadecenylamine, in Example 1, preceding, indicated by the formula:

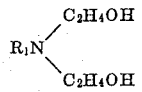

in which $R_1$ is a radical derived from technically pure stearic acid.

The compounds described in the preceding examples are well known compositions and the method of preparation is well known.

Hydroxylated Substituted High Molal Amides

Example 1

One pound mole of ricinoleic acid is reacted with one pound mole of monoethanolamine to give the corresponding amide. Such amide may be indicated by the following formula:

$$RCO\overset{H}{N}C_2H_4OH$$

in which RCO is the ricinoleyl radical.

Hydroxylated Substituted High Molal Amides

Example 2

One pound mole of ricinoleic acid is reacted with one pound mole of diethanolamine to give the corresponding amide. Such amide may be indicated by the following formula:

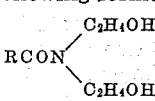

in which RCO is the ricinoleyl radical.

Hydroxylated Substituted High Molal Amides

Example 3

One pound mole of ricinoleic acid is reacted with one pound mole of 2-amino-2-methyl-1,3- propanediol to give the corresponding amide. Such amide may be indicated by the following formula:

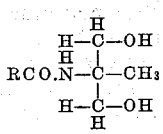

in which RCO is the ricinoleyl radical.

HYDROXYLATED SUBSTITUTED HIGH MOLAL AMIDES

Example 4

One pound mole of ricinoleic acid is reacted with one pound mole of 2-amino-2-ethyl-1,3-propanediol to give the corresponding amide.

HYDROXYLATED SUBSTITUTED HIGH MOLAL AMIDES

Example 5

One pound mole of ricinoleic acid is reacted with one pound mole of tris(hydroxymethyl)-aminomethane to give the corresponding amide.

HYDROXYLATED SUBSTITUTED HIGH MOLAL AMIDES

Example 6

One pound mole of ricinoleic acid is reacted with one pound mole of hydroxyethyl ethylenediamine to give the corresponding amide.

HYDROXYLATED SUBSTITUTED HIGH MOLAL AMIDES

Example 7

One pound mole of diethylenetriamine is reacted with one pound mole of ricinoleic acid to give the corresponding amide, which is then reacted with one pound mole of ethylene oxide to give the corresponding hydroxyethylamide.

We have found that if one mixes the types of materials indicated in low molar proportions, for instance, mole for mole in any instance, and two moles to a single mole, where there is a multiple of functional groups, one can then heat such mixtures to a point below the pyrolytic point of either reactant alone and obtain etherization with the elimination of one or more moles of water. In other words, if one were to take a hydroxylated high molal amide of the kind described, for instance hydroxyethyl oleoamide, one might find that it would have to be heated to a temperature of 300° C., or higher, before marked etherization took place. Similarly, one might heat a hydroxylated high molal amine of the kind described, for instance, bis(hydroxyethyl) octadecylamine, and find that it would have to be heated to a temperature of 300° C., or higher, before marked etherization took place in such instance.

If one prepares a mixture of the two reactants in equimolar proportions and heats the same, one will find that water can be eliminated readily at a temperature considerably lower than the pyrolytic point of either reactant. For instance, such mixture might only be heated to a temperature of 225°-270° C. Needless to say, where at least one of the reactants is polyfunctional, one might use two moles of the other reactant. For example, two moles of the hydroxylated amide of the kind just described might be reacted with one mole of a high molalamine having two hydroxyethyl amides. Likewise, the reactants can be so selected that one can use two moles of the high molal amine and one mole of the amide. Our preference, however, is to use mole for mole, regardless of whether the reactants are polyfunctional or not.

ETHERIZATION PROCEDURE

Example 1

One pound mole of bis(hydroxyethyl) octadecylamine is mixed with one pound mole of bis(hydroxyethyl) ricinoleoamide and the mixture is heated to a point above 200° C. and below the pyrolytic point of the individual reactants until etherization has taken place with the elimination of water. 4 to 12 hours may be required. Although more complicated reactions may take place, one of the simplest aspects of the reaction may be indicated in the following manner:

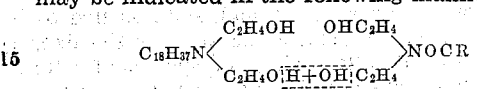

in which RCO is the ricinoleyl radical.

ETHERIZATION PROCEDURE

Example 2

A hydroxylated substituted high molal amide of the kind described under Example 3, preceding, is substituted for bis(hydroxyethyl) ricinoleoamide, in Example 1, preceding. Although more complicated reactions may take place, one of the simplest aspects of the reaction may be indicated in the following manner:

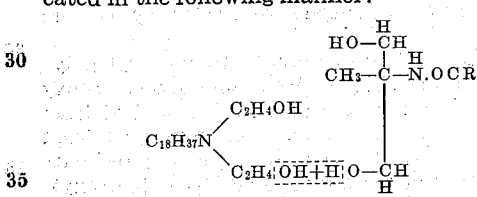

in which RCO is the ricinoleyl radical.

ETHERIZATION PROCEDURE

Example 3

A hydroxylated substituted high molal amide of the kind described under Example 4, preceding, is substituted for bis(hydroxyethyl) ricinoleoamide, in Example 1, preceding.

ETHERIZATION PROCEDURE

Example 4

A hydroxylated substituted high molal amide of the kind described under Example 5, preceding, is substituted for bis(hydroxyethyl) ricinoleoamide, in Example 1, preceding.

ETHERIZATION PROCEDURE

Example 5

A hydroxylated substituted high molal amide of the kind described under Example 6, preceding, is substituted for bis(hydroxyethyl) ricinoleoamide, in Example 1, preceding.

ETHERIZATION PROCEDURE

Example 6

A hydroxylated substituted high molal amide of the kind described under Example 7, preceding, is substituted for bis(hydroxyethyl) ricinoleoamide, in Example 1, preceding.

ETHERIZATION PROCEDURE

Example 7

The same procedure is followed as in "Etherization procedure, Examples 6 and 7," immediately preceding, except that one employs two pound moles of the hydroxylated amide for each pound mole of the hydroxylated amine.

ETHERIZATION PROCEDURE

Example 8

The same procedure is followed as in Examples 5 and 6, preceding, except that one employs two pound moles of the hydroxylated high molal amine and one pound mole of the hydroxylated amide.

The products obtained in the above manner may be employed as such for various purposes indicated, or may be used as intermediate reactants in the production of more complex compounds. Being basic in nature, they can combine with any suitable acid, such as hydrochloric acid, acetic acid, lactic acid, or the like, to produce acid salts. Many of such acid salts have pronounced emulsifying and surface tension depressant qualities.

It is recognized that etherization could take place between two molecules of the same kind of reactant, but it is our opinion that the etherization which takes place is substantially heteromolecular etherization, i. e., etherization involving two dissimilar molecules.

Attention is directed to our co-pending applications Serial Nos. 437,608 and 437,609, both filed April 3, 1942.

Having thus described our invention, what we claim as new and desire to secure by Letters Patent is:

1. In the method of manufacturing acyl polyaminoethers having at least one monocarboxy detergent-forming acid acyl radical and at least two amino nitrogen atoms, including at least one basic amino nitrogen atom, the step of heating a mixture of (a) a high molal basic hydroxylated amine having at least one hydrocarbon radical containing at least 8 and not more than 32 carbon atoms and at least one member of the class consisting of alkylol radicals and alkylol radicals in which the hydrocarbon chain is interrupted at least once by oxygen; and (b) a substituted amide having a monocarboxy detergent-forming acid acyl radical containing at least 8 and not more than 32 carbon atoms and at least one member of the class consisting of alkylol radicals and alkylol radicals in which the carbon atom chain is interrupted at least once by oxygen; said mixture being within the molar proportions of two to one and one to two; said heating being conducted at a temperature above 160° C. and below the pyrolytic point of either reactant and for a period of time to insure heteromolecular etherization.

2. In the method of manufacturing acyl polyaminoethers having at least one monocarboxy detergent-forming acid acyl radical and at least two amino nitrogen atoms, including at least one basic amino nitrogen atom, the step of heating a mixture of (a) a high molal basic hydroxylated monoamine having at least one hydrocarbon radical containing at least 8 and not more than 32 carbon atoms and at least one member of the class consisting of alkylol radicals and alkylol radicals in which the hydrocarbon chain is interrupted at least once by oxygen; and (b) a substituted amide having a monocarboxy detergent-forming acid acyl radical containing at least 8 and not more than 32 carbon atoms and at least one member of the class consisting of alkylol radicals and alkylol radicals in which the carbon atom chain is interrupted at least once by oxygen; said mixture being within the molar proportions of two to one and one to two; said heating being conducted at a temperature above 160° C. and below the pyrolytic point of either reactant and for a period of time to insure heteromolecular etherization.

3. In the method of manufacturing acyl polyaminoethers having at least one monocarboxy detergent-forming acid acyl radical and at least two amino nitrogen atoms, including at least one basic amino nitrogen atom, the step of heating a mixture of (a) a high molal basic hydroxylated monoamine having at least one hydrocarbon radical containing at least 8 and not more than 32 carbon atoms and at least one member of the class consisting of alkylol radicals and alkylol radicals in which the hydrocarbon chain is interrupted at least once by oxygen; and (b) a substituted monoaminoamide having a monocarboxy detergent-forming acid acyl radical containing at least 8 and not more than 32 carbon atoms and at least one member of the class consisting of alkylol radicals and alkylol radicals in which the carbon atom chain is interrupted at least once by oxygen; said mixture being within the molar proportions of two to one and one to two; said heating being conducted at a temperature above 160° C. and below the pyrolytic point of either reactant and for a period of time to insure heteromolecular etherization.

4. In the method of manufacturing acyl polyaminoethers having at least one monocarboxy detergent-forming acid acyl radical and at least two amino nitrogen atoms, including at least one basic amino nitrogen atom, the step of heating an equimolar mixture of (a) a high molal basic hydroxylated monoamine having at least one hydrocarbon radical containing at least 8 and not more than 32 carbon atoms and at least one member of the class consisting of alkylol radcals and alkylol radicals in which the hydrocarbon chain is interrupted at least once by oxygen; and (b) a substituted monoaminoamide having a monocarboxy detergent-forming acid acyl radical containing at least 8 and not more than 32 carbon atoms and at least one member of the class consisting of alkylol radicals and alkylol radicals in which the carbon atom chain is interrupted at least once by oxygen; said heating being conducted at a temperature above 160° C. and below the pyrolytic point of either reactant and for a period of time to insure heteromolecular etherization.

5. In the method of manufacturing acyl polyaminoethers having at least one higher fatty acid acyl radical and at least two amino nitrogen atoms, including at least one basic amino nitrogen atom, the step of heating an equimolar mixture of (a) a high molal basic hydroxylated monoamine having at least one hydrocarbon radical containing at least 8 and not more than 32 carbon atoms and at least one member of the class consisting of alkylol radicals and alkylol radicals in which the hydrocarbon chain is interrupted at least once by oxygen; and (b) a substituted monoaminoamide having a higher fatty acid acyl radical containing at least 8 and not more than 32 carbon atoms and at least one member of the class consisting of alkylol radicals and alkylol radicals in which the carbon atom chain is interrupted at least once by oxygen; said heating being conducted at a temperature above 160° C. and below the pyrolytic point of either reactant and for a period of time to insure heteromolecular etherization.

6. In the method of manufacturing acyl polyaminoethers having at least one unsaturated higher fatty acid acyl radical and at least two amino nitrogen atoms, including at least one basic amino nitrogen atom, the step of heating an equimolar mixture of (a) a high molal basic hydroxylated monoamine having at least one hydrocarbon radical containing at least 8 and not more than 32 carbon atoms and at least one member of the class consisting of alkylol radicals and alkylol radicals in which the hydrocarbon chain is interrupted at least once by oxygen; and (b) a substituted monoaminoamide having an unsaturated higher fatty acid acyl radical containing at least 8 and not more than 32 carbon atoms and at least one member of the class consisting of alkylol radicals and alkylol radicals in which the carbon atom chain is interrupted at least once by oxygen; said heating being conducted at a temperature above 160° C. and below the pyrolytic point of either reactant and for a period of time to insure heteromolecular etherization.

7. In the method of manufacturing acyl polyaminoethers having at least one unsaturated higher fatty acid acyl radical having 18 carbon atoms and at least two amino nitrogen atoms, including at least one basic amino nitrogen atom, the step of heating an equimolar mixture of (a) a high molal basic hydroxylated monoamine having at least one hydrocarbon radical containing at least 8 and not more than 32 carbon atoms and at least one member of the class consisting of alkylol radicals and alkylol radicals in which the hydrocarbon chain is interrupted at least once by oxygen; and (b) a substituted monoaminoamide having an unsaturated higher fatty acid acyl radical having 18 carbon atoms and at least one member of the class consisting of alkylol radicals and alkylol radicals in which the carbon atom chain is interrupted at least once by oxygen; said heating being conducted at a temperature above 160° C. and below the pyrolytic point of either reactant and for a period of time to insure heteromolecular etherization.

8. In the method of manufacturing acyl polyaminoethers having at least one ricinoleyl radical and at least two amino nitrogen atoms, including at least one basic amino nitrogen atom, the step of heating a mixture of (a) a high molal basic hydroxylated monoamine having at least one hydrocarbon radical containing at least 8 and not more than 32 carbon atoms and at least one member of the class consisting of alkylol radicals and alkylol radicals in which the hydrocarbon chain is interrupted at least once by oxygen; and (b) a substituted monoaminoamide having a ricinoleyl radical and at least one member of the class consisting of alkylol radicals and alkylol radicals in which the carbon atom chain is interrupted at least once by oxygen; said heating being conducted at a temperature above 160° C. and below the pyrolytic point of either reactant and for a period of time to insure heteromolecular etherization.

MELVIN DE GROOTE.
BERNHARD KEISER.